(12) United States Patent
Caretta et al.

(10) Patent No.: US 8,360,121 B2
(45) Date of Patent: Jan. 29, 2013

(54) WHEEL HAVING TEMPERATURE COMPENSATED AND CONTROLLED PRESSURE

(75) Inventors: Renato Caretta, Milan (IT); Pier Giuseppe Piantanida, Milan (IT); Giorgia Sgalari, Milan (IT); Massimo Filippi, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 208 days.

(21) Appl. No.: 10/589,558

(22) PCT Filed: Feb. 18, 2005

(86) PCT No.: PCT/EP2005/001667
§ 371 (c)(1),
(2), (4) Date: May 15, 2007

(87) PCT Pub. No.: WO2005/084967
PCT Pub. Date: Sep. 15, 2005

(65) Prior Publication Data
US 2008/0035203 A1 Feb. 14, 2008

(30) Foreign Application Priority Data
Feb. 27, 2004 (WO) .................. PCT/IB2004/000502

(51) Int. Cl.
*B60C 23/10* (2006.01)
(52) U.S. Cl. ........................................ 152/427; 152/418
(58) Field of Classification Search .......... 152/415–416, 152/418, 427, 429; 137/79–80
See application file for complete search history.

(56) References Cited

U.S. PATENT DOCUMENTS

| | | | | |
|---|---|---|---|---|
| 1,993,814 | A | * | 3/1935 | Vaughn et al. ............... 236/48 R |
| 4,067,376 | A | | 1/1978 | Barabino |
| 4,883,082 | A | * | 11/1989 | Pirkle .............................. 137/79 |
| 5,427,132 | A | * | 6/1995 | Fenner, Jr. ...................... 137/79 |
| 6,533,010 | B1 | | 3/2003 | Alonso et al. |
| 6,601,625 | B2 | | 8/2003 | Rheinhardt |
| 2002/0104374 | A1 | | 8/2002 | Merendino, Sr. |

FOREIGN PATENT DOCUMENTS

| WO | WO 02/074561 A1 | 9/2002 |
|---|---|---|
| WO | WO 03/057515 A1 | 7/2003 |

* cited by examiner

*Primary Examiner* — Jason Bellinger
(74) *Attorney, Agent, or Firm* — Finnegan, Henderson, Farabow, Garrett & Dunner, L.L.P.

(57) ABSTRACT

A wheel having a controlled and compensated pressure includes a rim associated with a tank adapted to be filled with a fluid to a first pressure; a tyre mounted on the rim and having an inner volume inflated to an operating pressure, the operating pressure being lower than the first pressure; at least one valve adapted to regulate a communication between the tank and the inner volume of the tyre, the valve having at least one elastic element operatively associated with a closure member designed to open and close a port of the valve to bring the tank into communication with the tyre when the pressure of the tyre is lower than the operating pressure, the elastic element having an elastic constant showing a variation of 10% to 40% within a temperature range of about −50° C. to about 50° C.

80 Claims, 6 Drawing Sheets

WHEEL HAVING TEMPERATURE COMPENSATED AND CONTROLLED PRESSURE

CROSS REFERENCE TO RELATED APPLICATION

This application is a national phase application based on PCT/EP2005/001667, filed Feb. 18, 2005, which claims the priority of PCT International Application No. PCT/IB04/000502, filed Feb. 27, 2004, the content of both of which is incorporated herein by reference.

BACKGROUND OF THE INVENTION

1. Field of the Invention

The present invention relates to a wheel having a compensated and controlled pressure.

2. Description of the Related Art

A wheel for two-wheeled or four-wheeled vehicles generally comprises a rim coupled with a tyre that is inflated to a given operating pressure.

Said tyre generally comprises a carcass structure having at least one carcass ply, and at least one annular reinforcing structure associated with the carcass ply, a tread band of elastomer material at a radially external position to the carcass structure, a belt structure interposed between the carcass structure and tread band and a pair of sidewalls at axially opposite positions on the carcass structure.

In tubeless tyres, the tyre airtightness is ensured by the radially inner layer of said carcass structure generally called "liner". When in use, due to the natural air loss through said radially inner layer (which layer at all events is never perfectly impervious to air), pressure within the tyre decreases thereby obliging the vehicle driver to carry out periodical restoration of same.

In an attempt to make the tyre pressure substantially constant over a rather long period of time, it was suggested use of rims internally housing a tank for gas under pressure at a higher pressure than the operating pressure of the tyre. By one or more valves suitably operated, pressure is restored when required.

Patent U.S. Pat. No. 6,601,625 B2 discloses a wheel with a compressed air tank integrated into the rim. More specifically it is disclosed a high pressure tank to store compressed air from an outer source, a first mechanical valve allowing the compressed air to flow from a source external to the high pressure tank, a second mechanical valve allowing air passage from the high pressure tank to the inner tube of the tyre, a third valve releasing air from the inner tube of the tyre, and a fourth valve releasing air from the high pressure tank. The wheel described in said patent keeps the tyre pressure within a predetermined value in a mechanical manner, reducing the necessity for the vehicle driver to manually inflate the tyre to reach the desired pressure. When pressure within the tyre decreases under a predetermined threshold value, the air stored in the high pressure tank is released into the tyre maintaining the latter inflated to the desired minimum pressure; on the contrary, when pressure in the tyre increases beyond a predetermined threshold value, the air is released from the tyre to the surrounding atmosphere.

Patent U.S. Pat. No. 4,067,376 depicts a system for automatic re-admission of the air lost from a tyre while the vehicle is running in order to minimise the effects of an explosion. The wheel is formed with an integrated annular bag adapted to store an amount of compressed air under high pressure. A pressure safety valve is placed between said bag and the tyre and is adapted to release air from the bag to the tyre each time pressure within the tyre decreases below a predetermined limit.

SUMMARY OF THE INVENTION

The Applicant has noticed that known devices do not allow a pressure variation within the tyre to be compensated for in a convenient manner when it is due to important temperature variations, of some ten degrees for example. More specifically, in case of strong temperature ranges, for example due to stopping of the vehicle in places where temperature may decrease some ten degrees under zero overnight, pressure within each tyre will decrease, since said pressure, as known, is proportional to the absolute temperature, following the gas laws. The Applicant could notice that pressure restoration to such low temperatures through passage of compressed air from the tank to the tyre would involve an overpressure during running or, in any case, at the moment the air temperature within the tyre should rise again. This overpressure would cause evacuation of the previously admitted air to restore the preestablished pressure. In this way the operating duration of the high pressure tank would be substantially reduced, because at each temperature lowering due to the external environment, an unnecessary admission of air would be generated, which air would be subsequently discharged to avoid overpressures. Neither is it possible to choose a solution according to which the operating capacity of said tanks is increased by loading them to some ten bars, both due to safety reasons and for the purpose of not making filling more difficult. From a practical point of view, in fact, use of the compressors currently existing in the service areas is advantageous, said compressors generally providing compressed air at a pressure of about 8-10 bars.

The Applicant has therefore perceived that for efficiently controlling the inner pressure of a tyre over long periods of time, of one year or more for example, without a manual reloading of compressed air being required, it is necessary to cause the step of re-establishment of the operating pressure of the tyre to take place only when pressure has gone down as a result of true air losses (micropunctures, lack of airtightness of the liner, etc.) and not for reasons due to lowering of the room temperature.

The Applicant however felt the necessity not to make the "wheel" system more complicated with the addition of sensors and electronic devices to carry out re-establishment of the operating pressure of the tyre in the manner as above illustrated, trying to find a simple technical solution that was reliable and applicable at low costs, within the mechanical field. To this aim the Applicant could verify that making at least one passage element or valve inserted between a tank of fluid under pressure associated with the rim of a wheel and the tyre mounted on said rim, capable of compensating for pressure variations with respect to variations of the room temperature, allows the above discussed problem to be overcome and the operating pressure of the tyre to be restored when said pressure has gone down due to reasons different from those ascribable to lowering of the room temperature.

More specifically, in the solution found by the Applicant it is provided to place at least one valve body within a wheel between a tank of gas under pressure associated with the rim of said wheel and a tyre mounted thereon, said valve body having an elastic element with an elastic constant (K) varying in a temperature range from −50° C. to +50° C. in such a manner that said valve is maintained to a closed position following a reduction in the inner tyre pressure due to a temperature reduction within said range.

In a first aspect, the invention relates to a method of controlling the inner pressure of a tyre mounted on a rim, said method comprising the steps of:

inflating an inner volume of the tyre to an operating pressure at a reference temperature;

admitting a fluid compressed to a first pressure higher that the operating pressure of the tyre at the reference temperature, into a tank associated with the rim;

bringing the inner volume of said tyre into communication with said tank when pressure of the inner volume of said tyre is lower than said operating pressure by means of at least one mechanical valve opening of which is controlled by an elastic element having an elastic constant (K) varying within a temperature range from $-50°$ C. to $+50°$ C. in such a manner that said valve is maintained to a closed position following a reduction in the inner tyre pressure due to a temperature reduction within said range;

stopping the communication between said inner volume and tank when said tyre pressure is substantially equal to said operating pressure.

Therefore the tyre pressure is maintained constant over long periods of time due to the fact that, the other conditions being the same, the operating duration of the tank of fluid under pressure is increased. In fact, fluid (air, for example) admissions from the tank to said tyre are substantially avoided when the tyre pressure decreases due to lowering of the external temperature; in this way the subsequent fluid discharges due the temperature increases are avoided.

In a preferred embodiment of said method, said temperature range is included between about $-30°$ C. and about $+50°$ C.

In a further embodiment, said temperature range is included between about $-30°$ C. and about $+20°$ C.

In a preferred embodiment of said method, said elastic element controlling opening of said valve has a value of elastic constant measured at $-50°$ C. ($K^{-50°\ C.}$) differing from the value of elastic constant measured at $+50°$ C. ($K^{+50°\ C.}$) by at least 10% with respect to the value of elastic constant measured at $+50°$ C. ($K^{+50°\ C.}$).

In a different embodiment, said elastic element controlling opening of said valve has a value of elastic constant measured at $-50°$ C. ($K^{-50°\ C.}$) differing from the value of elastic constant measured at $+50°$ C. ($K^{+50°\ C.}$) by no more than 40% with respect to the value of elastic constant measured at $+50°$ C. ($K^{+50°\ C.}$).

In another embodiment, said elastic element controlling opening of said valve has a value of elastic constant measured at $-30°$ C. ($K^{-30°\ C.}$) differing from the value of elastic constant measured at $+50°$ C. ($K^{+50°\ C.}$) by at least 10% with respect to the value of elastic constant measured at $+50°$ C. ($K^{+50°\ C.}$).

In another embodiment, said elastic element controlling opening of said valve has a value of elastic constant measured at $-30°$ C. ($K^{-30°\ C.}$) differing from the value of elastic constant measured at $+50°$ C. ($K^{+50°\ C.}$) by no more than 40% with respect to the value of elastic constant measured at $+50°$ C. ($K^{+50°\ C.}$).

In another embodiment, said elastic element controlling opening of said valve has a value of elastic constant measured at $-30°$ C. ($K^{-30°\ C.}$) differing from the value of elastic constant measured at $+20°$ C. ($K^{+20°\ C.}$) by at least 10% with respect to the value of elastic constant measured at $+20°$ C. ($K^{+20°\ C.}$).

In another embodiment, said elastic element controlling opening of said valve has a value of elastic constant measured at $-30°$ C. ($K^{-30°\ C.}$) differing from the value of elastic constant measured at $+20°$ C. ($K^{+20°\ C.}$) by no more than 40% with respect to the value of elastic constant measured at $+20°$ C. ($K^{+20°\ C.}$).

In another embodiment, said elastic element controlling opening of said valve has a value of elastic constant measured at $-50°$ C. ($K^{-50°\ C.}$) differing from the value of elastic constant measured at $+50°$ C. ($K^{+50°\ C.}$) by at least 20% with respect to the value of elastic constant measured at $+50°$ C. ($K^{+50°\ C.}$).

In another embodiment, said elastic element controlling opening of said valve has a value of elastic constant measured at $-50°$ C. ($K^{-50°\ C.}$) differing from the value of elastic constant measured at $+50°$ C. ($K^{+50°\ C.}$) by no more than 30% with respect to the value of elastic constant measured at $+50°$ C. ($K^{+50°\ C.}$).

In another embodiment, said elastic element controlling opening of said valve has a value of elastic constant measured at $-30°$ C. ($K^{-30°\ C.}$) differing from the value of elastic constant measured at $+50°$ C. ($K^{+50°\ C.}$) by at least 20% with respect to the value of elastic constant measured at $+50°$ C. ($K^{+50°\ C.}$).

In another embodiment, said elastic element controlling opening of said valve has a value of elastic constant measured at $-30°$ C. ($K^{-30°\ C.}$) differing from the value of elastic constant measured at $+50°$ C. ($K^{+50°\ C.}$) by no more than 30% with respect to the value of elastic constant measured at $+50°$ C. ($K^{+50°\ C.}$).

In another embodiment, said elastic element controlling opening of said valve has a value of elastic constant measured at $-30°$ C. ($K^{-30°\ C.}$) differing from the value of elastic constant measured at $+20°$ C. ($K^{+20°\ C.}$) by at least 20% with respect to the value of elastic constant measured at $+20°$ C. ($K^{+20°\ C.}$).

In another embodiment, said elastic element controlling opening of said valve has a value of elastic constant measured at $-30°$ C. ($K^{-30°\ C.}$) differing from the value of elastic constant measured at $+20°$ C. ($K^{+20°\ C.}$) by no more than 30% with respect to the value of elastic constant measured at $+20°$ C. ($K^{+20°\ C.}$).

Advantageously, in order to obtain wide time gaps between two manual reloading operations in succession, the ratio between said operating pressure of the tyre and said first pressure in said tank is included between about 0.1 and about 0.6.

By optimising the available volumes, in a further embodiment, the ratio between said operating pressure of the tyre and said first pressure in said tank is included between about 0.2 and about 0.4.

Advantageously, said method allows widely spread reloading devices to be used, due to the fact that said first pressure in said tank is included between about 8 and about 12 bars.

In a different preferred embodiment said first pressure in said tank is included between about 8.5 and about 10 bars.

To improve the steadiness of the wheel system, said step of bringing the inner volume of said tyre into communication with said tank takes place when the pressure of the inner volume of said tyre is lower than said operating pressure by at least 5%.

In a further aspect, the invention relates to a wheel having a controlled and compensated pressure, comprising:

a rim associated with a tank adapted to be filled with a fluid to a first pressure;

a tyre mounted on said rim and having an inner volume inflated to an operating pressure, said operating pressure being lower than said first pressure;

at least one valve adapted to regulate a communication between said tank and the inner volume of said tyre;

said valve comprising at least one elastic element operatively associated with a closure member designed to open and close a port in said valve to bring said tank into communication with said tyre when pressure in said tyre is lower than said operating pressure, said elastic element having an elastic constant (K) varying within a temperature range from −50° C. to +50° C. in such a manner that the valve is maintained to a closed position following a reduction in the inner tyre pressure due to a temperature reduction within said range.

In a preferred embodiment said temperature range is included between about −30° C. and about +50° C.

In a further embodiment, said temperature range is included between about −30° C. and about +20° C.

In another preferred embodiment said tank is integrated into said rim, for space optimization.

In a further embodiment, in order to divide the available volumes in an optimal manner, said tank involves such a volume that the ratio between said volume of said tank and said inner volume of the tyre is included between about 0.1 and about 0.4.

In a different embodiment, said ratio is included between about 0.12 and about 0.25.

In a preferred embodiment said elastic element is a spring.

In another preferred embodiment, said elastic element comprises a second spring operatively associated to said spring.

In a different embodiment, said second spring has an elastic constant (K) substantially constant within a temperature range from −50° C. to +50° C.

In a preferred embodiment, said second spring supports a major portion of the load of said elastic element.

Preferably, the load supported by the second spring is comprised between about 60% and about 95% of the load supported by said elastic element.

More preferably, the load supported by the second spring is comprised between about 70% and about 80% of the load supported by said elastic element.

In another embodiment the second spring is concentrically coupled to said spring.

In a preferred embodiment the second spring is external with respect to said spring.

To enable an embodiment in which a thrust spring is provided, said elastic constant (K) decreases on decreasing of the temperature in said temperature range.

To obtain an embodiment in which a pulling spring is provided, said elastic constant (K) increases on decreasing of the temperature in said temperature range.

In a preferred embodiment, said wheel comprises an inflation valve operatively associated with said tank.

In a different embodiment, said wheel comprises a control and restoration valve associated with said tyre.

BRIEF DESCRIPTION OF THE DRAWINGS

Further features and advantages of the invention will become more apparent from the detailed description of some preferred but not exclusive embodiments of a wheel having a controlled and compensated pressure in accordance with the present invention.

This description will be set out hereinafter with reference to the accompanying drawings, given by way of non-limiting example, in which.

DETAILED DESCRIPTION OF THE INVENTION

Figure 2:
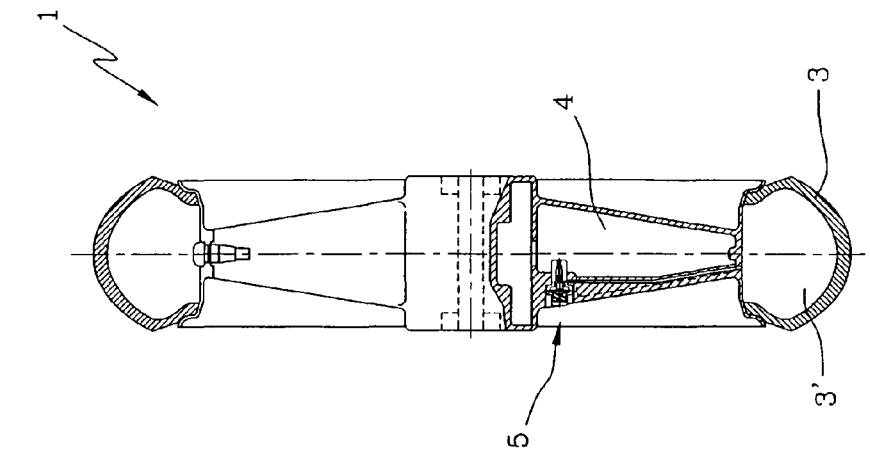
FIG. 2 is a side view partly in section of the wheel shown in FIG. 1.
Figure 1:
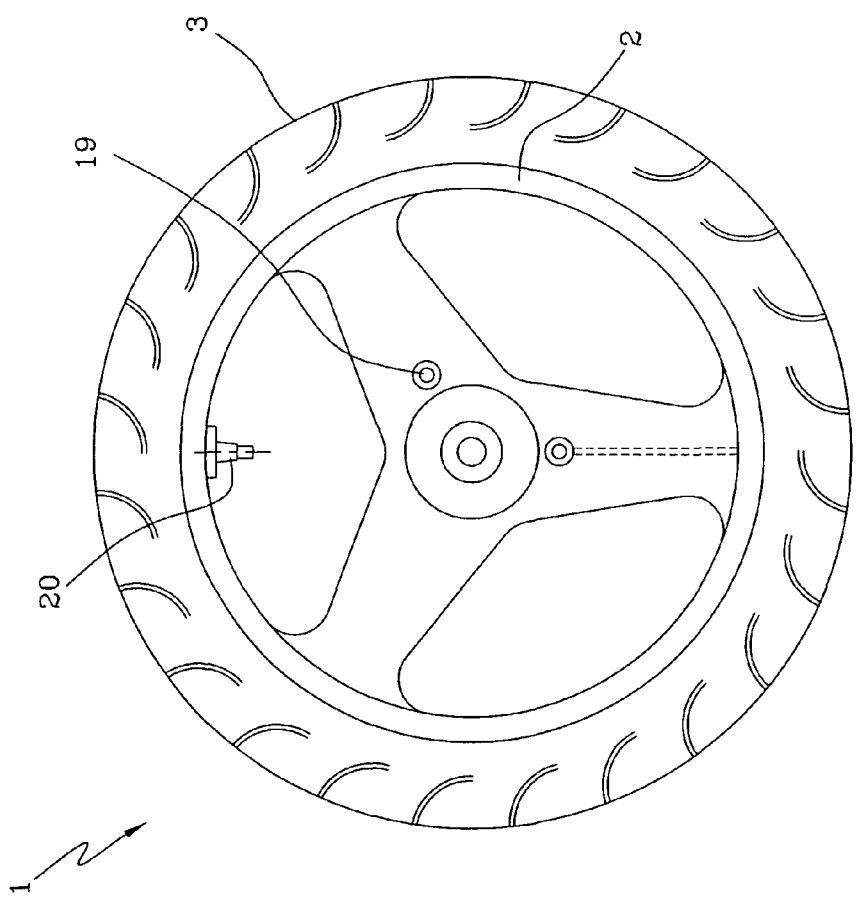
FIG. 1 is a vertical view of a wheel in accordance with the invention.
Figure 4:
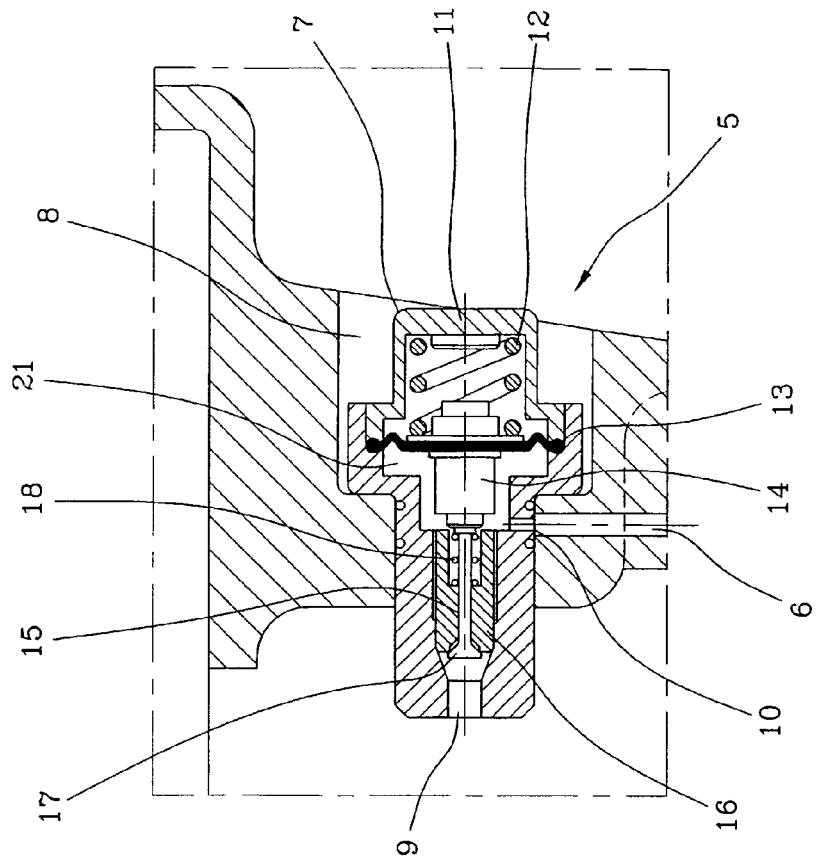
FIG. 4 is an enlarged section of a detail of the wheel in accordance with the invention.
Figure 3:
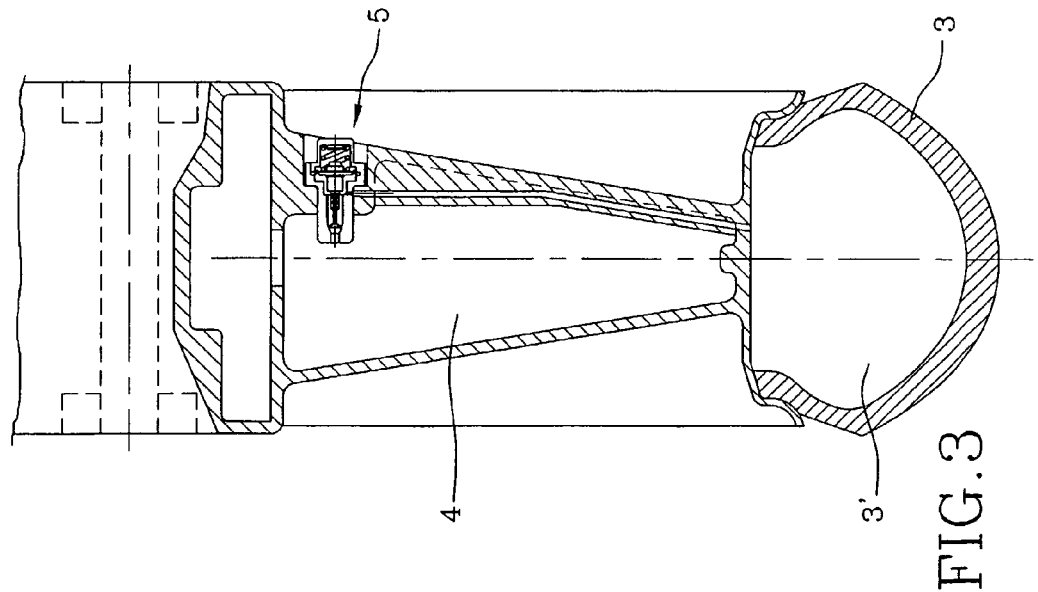
FIG. 3 shows an enlarged portion of said side view.
Figure 6:
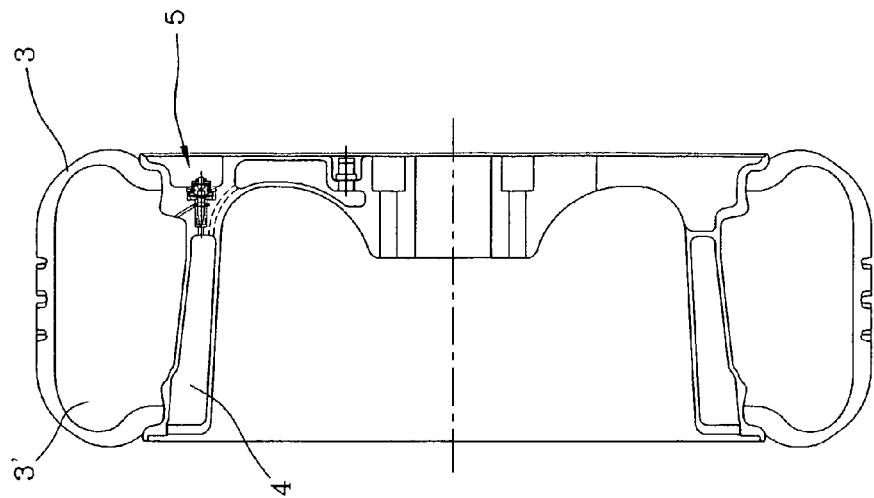
FIG. 6 is a side view partly in section of the wheel shown in FIG. 5.
Figure 5:
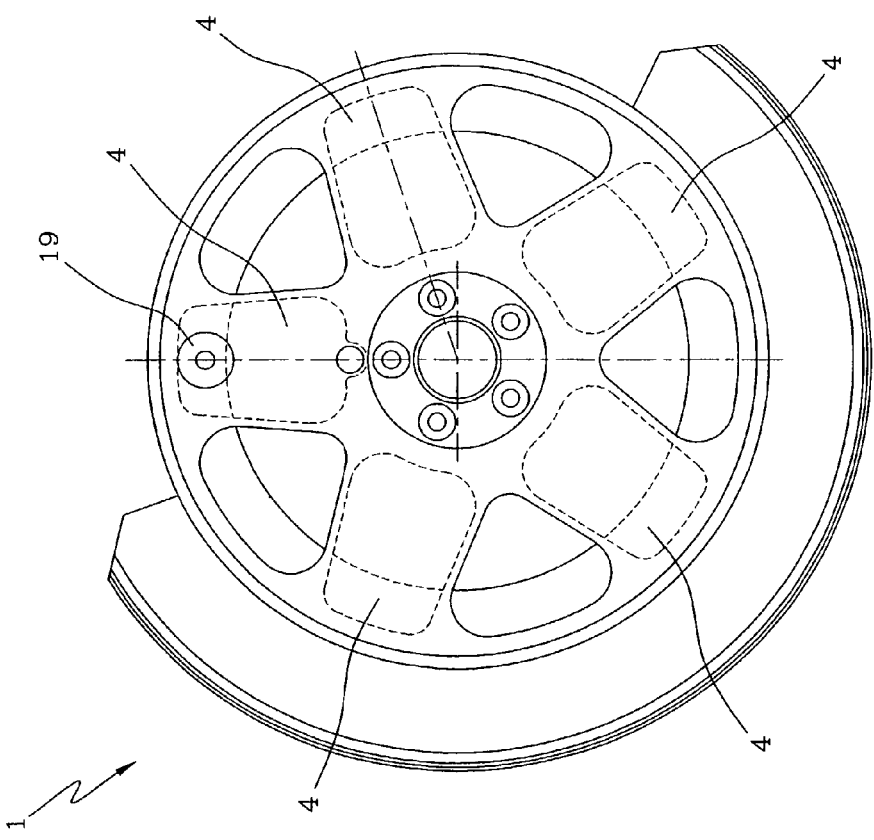
FIG. 5 is a partial vertical view of a second embodiment of the wheel in accordance with the invention.
Figure 7:
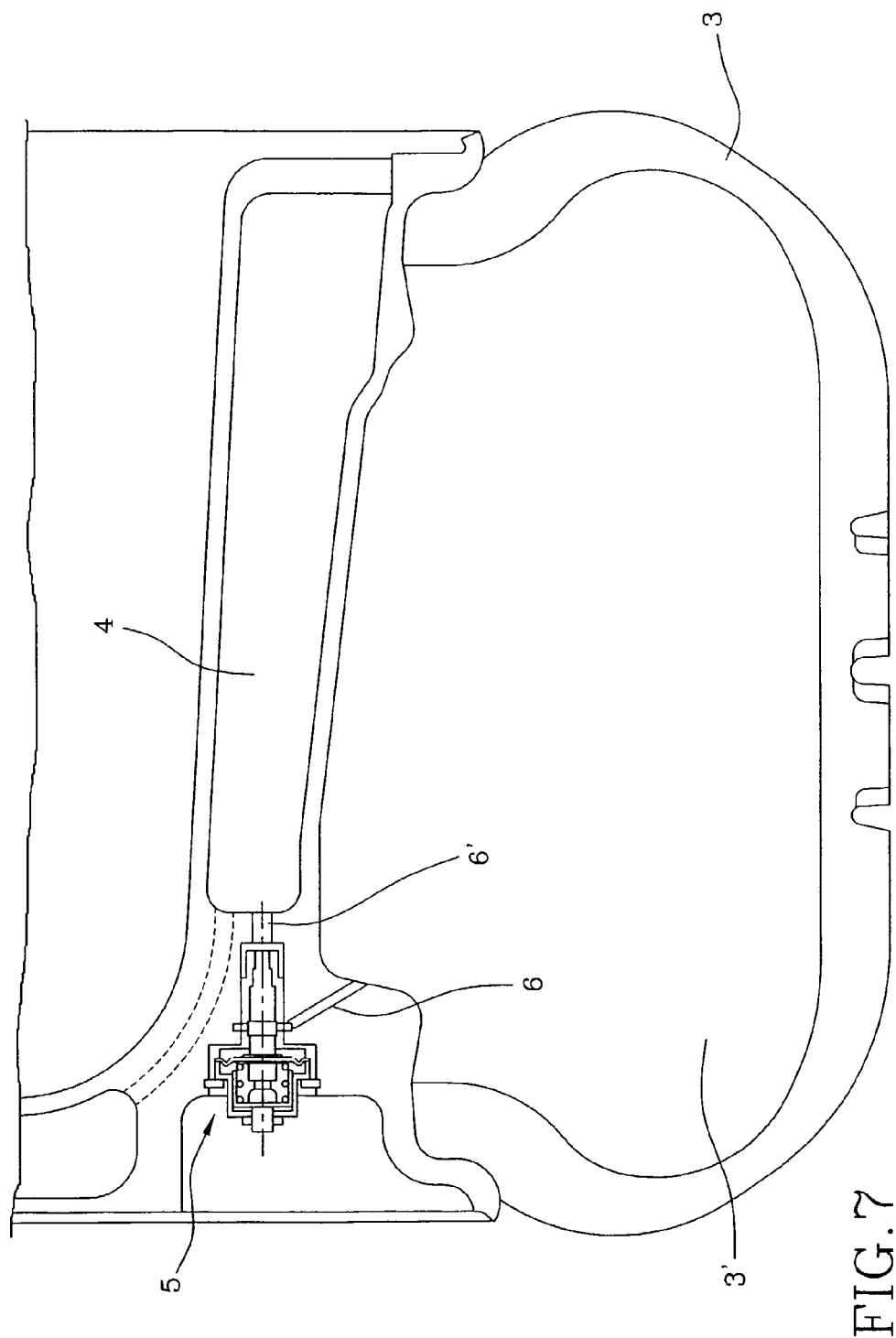
FIG. 7 shows an enlarged portion of the side view shown in FIG. 6.

As shown in FIGS. 1, 2, 5 and 6, wheel 1 for two-wheeled vehicles (FIGS. 1, 2) or four-wheeled vehicles (FIGS. 5, 6) in accordance with the invention, comprises a rim 2 on which a tyre 3 of an inner volume 3' is mounted. Provided in rim 2 is a tank 4 associated with said rim and preferably integrated into the latter, said tank being suitable to contain a fluid under pressure, said fluid being air or a substantially inert gas such as nitrogen, for example.

In accordance with a preferred embodiment, the ratio between the operating pressure of tyre 3 and a first pressure existing in said tank 4 when fully loaded varies between about 0.1 and about 0.6, preferably between about 0.2 and about 0.4.

According to a further preferred embodiment, the ratio between the volume of said tank 4 and said inner volume 3' of the tyre is included between about 0.1 and about 0.4, preferably between about 0.12 and about 0.25.

The rim 2 preferably houses a mechanical valve 5 at a radially internal position not far from the rotation centre of the wheel, which valve allows communication between tank 4 and the inner volume 3' of tyre 3 to be regulated.

Preferably, said communication is obtained by providing, within rim 2, a duct 6 connecting said valve 5 with the inner volume of said tyre 3, said valve 5 further providing a connection with said tank 4 either directly or through a further duct 6'.

Said valve 5 preferably comprises a valve body 7 housed in a suitable seat 8 formed in said rim 2, which valve body has a first port 9 for connection with said tank 4 and a second port 10 for connection with said tyre 3 and therefore preferably connected with said duct 6.

As shown in FIGS. 2, 3, 6 and 7, said valve body 7 is provided, internally of the axially external end, i.e. preferably at the opposite end of said first port 9, with a base disc 11 on which an elastic element, preferably a spring 12, rests.

Advantageously, said spring 12 is made of a material preferably selected from the so-called "shape memory alloy" (SMA) materials, in such a manner that its elastic constant K greatly depends on temperature.

Figure 8:
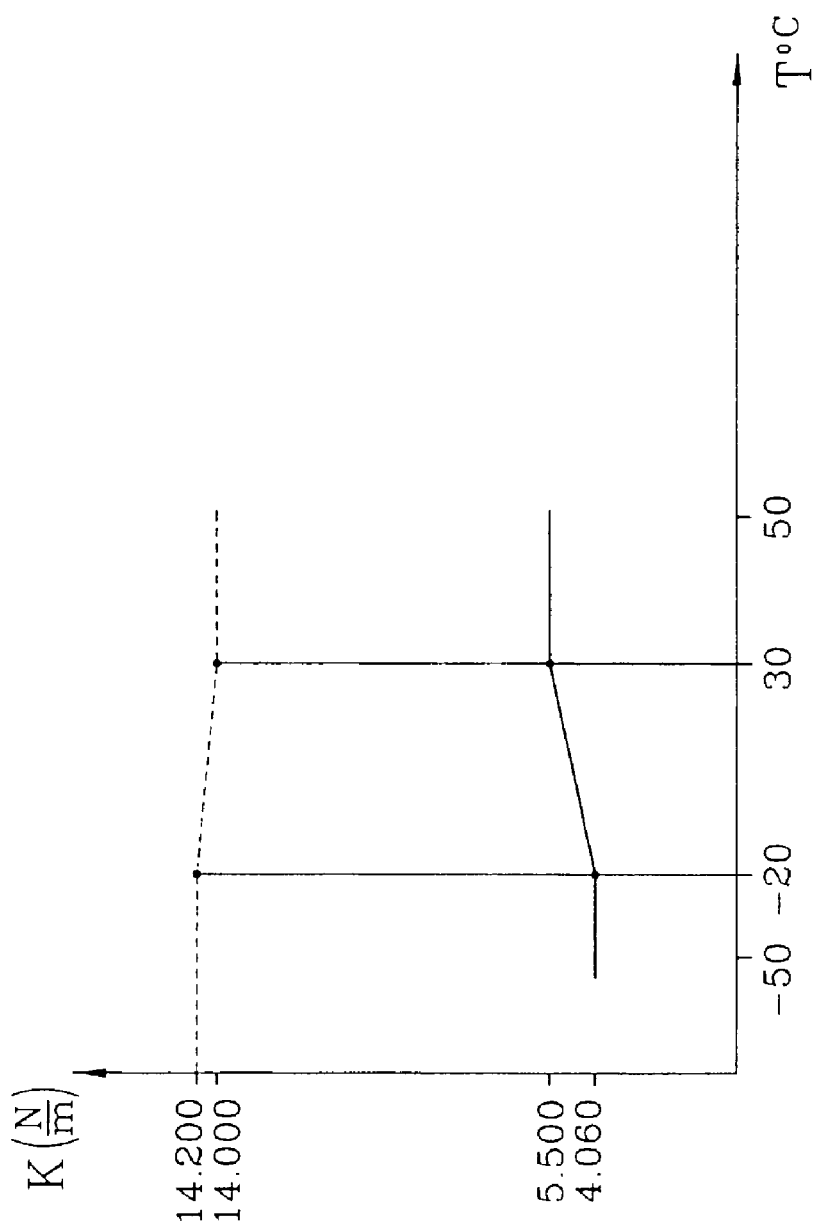
FIG. 8 is a graph showing the variation of an elastic constant of an element in said wheel upon varying of the temperature.

For example, as shown in the graph in FIG. 8, it is possible to see that such dependence, in a graph Temperature (x axis)/Value of the elastic constant K (y axis) is substantially expressed by a straight line parallel to the x axis (chain line) for springs made of standard spring steel materials (i.e. the elastic constant is in this case substantially independent of temperature) within a predetermined temperature range, between −50° C. and +50° C. for example, which range, as better clarified in the following, can be coincident with the preferred temperature of use of wheel 1. Said dependence within said range is on the contrary expressed by an increasing or decreasing function for the springs 12 in accordance with the invention made of the above specified materials.

Preferably, in accordance with the invention, provision is made for use of materials having a temperature range in which the elastic constant K of the springs made with use of said materials greatly varies between about −50° C. and about +50° C., said range being preferably included between about −30° C. and about +50° C., and more preferably included between about −30° C. and about +20° C.

In particular, in the last-mentioned temperature range (−30° C./+20° C.) the value of this constant K varies by approximately 26% with respect to the value found at the upper end of the range (+20° C.) for a spring made of a nickel-titanium steel (diameter of the wire 1.2 mm, 2 useful coils), more specifically from about 5,500 N/m (at 20° C.) to about 4,060 N/m (at −30° C.).

The employed materials are in any case selected in such a manner that said variation is included between about 10% and about 40%, preferably between about 20% and about 30% in a predetermined temperature range, at least included between −50° C. and 50° C. or narrower.

More specifically, spring 12 controlling opening of valve 5 has a value of the elastic constant measured at the lower end of said range (at −50° C. ($K^{-50°\,C.}$) for example) differing from the value of the elastic constant measured at the upper end of said range (at +50° C. ($K^{+50°\,C.}$) for example) by at least 10% and preferably by no more than 40%, with respect to the value of the elastic constant measured at the upper end of said range (at +50° C. ($K^{+50°\,C.}$) for example), that is to say:

$$\Delta K = \frac{|K^{+50°\,C.} - K^{-50°\,C.}|}{K^{+50°\,C.}} * 100 \geq 10\%$$

and $$\Delta K = \frac{|K^{+50°\,C.} - K^{-50°\,C.}|}{K^{+50°\,C.}} * 100 \leq 40\%$$

Preferably these variations are included between 20% and 30%, that is to say:

$$\Delta K = \frac{|K^{+50°\,C.} - K^{-50°\,C.}|}{K^{+50°\,C.}} * 100 \geq 20\%$$

and $$\Delta K = \frac{|K^{+50°\,C.} - K^{-50°\,C.}|}{K^{+50°\,C.}} * 100 \leq 30\%$$

The same relations will be also valid for narrower temperature ranges, such as, for example, those previously mentioned: −30° C./+50° C. and −30° C./+20° C., and there will be consequently a $K^{-50°\,C.}$ and a $K^{+20°\,C.}$.

Taking into account the previously illustrated example of a nickel-titanium steel, the following comes out:

$$\Delta K = \frac{|K^{+20°\,C.} - K^{-30°\,C.}|}{K^{+20°\,C.}} * 100 \cong 26{,}18\%$$

In accordance with said preferred solution, this dependence on temperature of the elastic constant is represented by a function increasing in said predetermined temperature range (FIG. 8).

Finally, in the same FIG. 8 it is possible to see that a spring made of a traditional spring steel, a UNI steel Class C for example, has a substantially constant value of the elastic constant K in the same temperature range (−30° C./+20° C.), said value being substantially equal to about 14,000 N/m at +20° C. and equal to about 14,200 N/m at −30° C., from which a variation ΔK equal to about 1.43% is drawn (diameter 1.2 mm, 3.5 useful coils).

Figure 9:
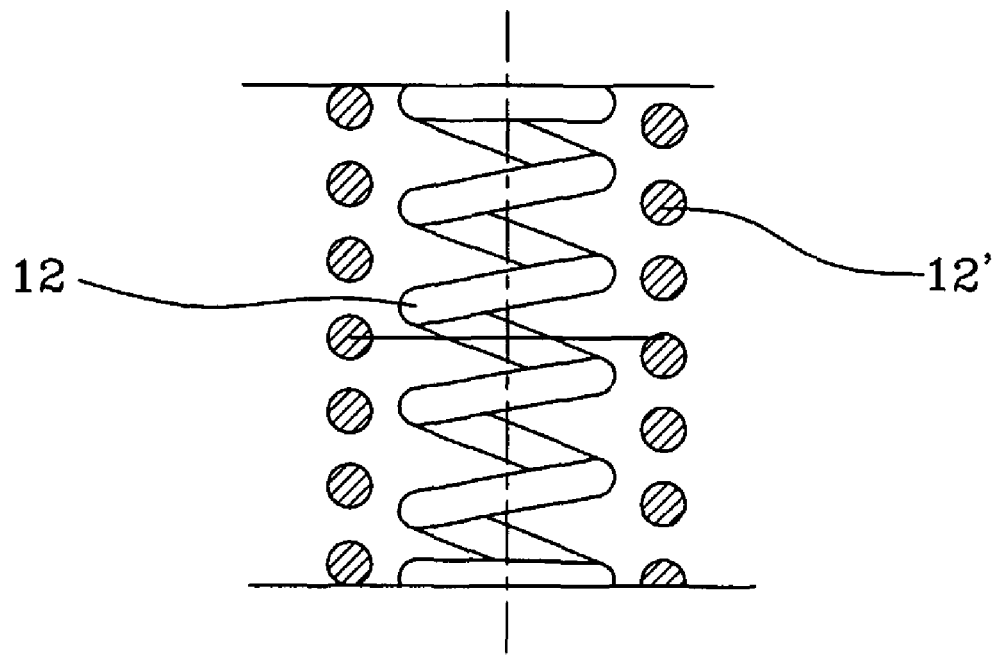
FIG. 9 schematically shows a detail of a preferred embodiment in accordance with the invention.

In another preferred embodiment, as shown in FIG. 9, said elastic element comprises a second spring 12' operatively associated to spring 12. In particular, the second spring 12' is a spring made of traditional spring steel (e.g. UNI steel Class C), the spring 12 being made of shape memory alloy (SMA) materials as above explained. Therefore, the elastic constant K of the second spring 12' is substantially constant in a temperature range comprised between −50° C. and +50° C.

Preferably, springs 12, and 12' are concentrically coupled, so that the second spring 12' is external with respect to spring 12. Preferably, the load supported by said elastic element is divided between springs 12 and 12' in such a way that the second spring 12' supports the major portion of said load. Consequently, valve 5 increases its sensitivity to temperature variation, because the spring 12 supports only a small load. Within this preferred embodiment and considering a Force/Elongation diagram, the load supported by spring 12 lies in a region of the diagram in which the curve is not asymptotic, i.e. a region in which the ratio between force and elongation is substantially linear. In a preferred embodiment, the load supported by said second spring 12' is comprised between about 60% and about 95% of the load supported by said elastic element, and more preferably between about 70% and about 80%.

As shown in FIGS. 2, 3, 4, 6 and 7, spring 12 is advantageously associated with a diaphragm 13 delimiting, by its axial position, the volume of a bag 21 communicating with said duct 6 and with the axially internal end of said valve body 7, i.e. the portion thereof close to the first port 9.

Said diaphragm 13 is connected with a cap 14 extending in an axial direction and the other end of which may get into contact with a needle housed in a bush 16 and terminating with a closure member 17 intervention of which allows passage of fluid through said first port 9 or not. Needle 15 is further maintained in place by another elastic element, such as a spring 18 for example.

Preferably, present on rim 2 is an inflation valve 19 directly in communication with tank 4, whereas in a further preferred embodiment a control and restoration valve 20 is provided that is in communication with the inner volume 3' of tyre 3.

Pressure control and compensation within said wheel 1 take place as follows.

First, by a standard compressor for example, air is admitted into tank 4, preferably through the inflation valve 19 to a given room temperature, of 15, 20, 25° C. or other value for example, said temperature being here and in the following identified as reference temperature TR.

Initially tyre 3 is deflated, so that spring 12, preloaded to a given reference value in relation to the desired operating pressure within the tyre (that can generally vary from about 1.7 to about 5.5 bars, depending on the different tyre types), exerts pressure on the diaphragm 13 bringing cap 14 to act against needle 15, which action leads the closure member 17 to open the passage through port 9 thereby connecting tank 4 to bag 21 and therefrom to duct 6 and tyre 3.

When pressure within the tyre reaches the prescribed operating pressure, this pressure also exerts its action on diaphragm 13 that overcomes the spring 12 preload and causes separation of cap 14 from needle 15. Spring 18 brings needle 15 back to the rest position dragging along the closure member 17 therewith to a closed position, thus inhibiting passage of fluid under pressure between tank 4 and bag 21. Then tank 4 is loaded to its rated capacity, generally included between 8 and 12 bars, more preferably between 8.5 and 10 bars.

During operation of the vehicle on which wheels 1 in accordance with the invention are mounted, small air losses occur due either to an imperfect airtightness of the radially inner layer of the tyre carcass structure, or to an imperfect adhesion between the tyre bead and the rim flange on which the bead bears, said pressure losses being quantifiable to about 0.1 bars/month. By reducing pressure in the inner volume 3' of tyre 3, this reduction is transmitted to the bag 21 through duct 6. Consequently spring 12 acts against diaphragm 13 and moves the closure member 17 as above described to the open position, until pressure in the tyre, through bag 21 and therefore diaphragm 13, balances the force exerted by the calibration preload of spring 12.

It will be appreciated that the section difference between the parts in contact of cap 14 and needle 15 (the cap end in contact with the needle is greater than the needle contact section) allows spring 12 that is calibrated on a preload relating to the operating pressure of the tyre, to overcome the force exerted by the fluid under pressure in tank 4 and causing the closure member 17 to keep closed, which pressure at the beginning is preferably about 2.5-5 times the operating pressure of the tyre, as previously seen.

Advantageously, valve 5 is calibrated so that it begins operating only after the reduction in pressure within the inner volume 3' has reached at least 5% of the operating pressure; in other words, taking into account what previously stated, such a reduction must preferably be included between about 0.085 and about 0.275 bars. In this way steadiness to the wheel assembly is ensured, small reloading operations being avoided when minimum pressure losses occur.

When the vehicle is not running and the external temperature decreases, due to the known gas laws the pressure within the tyre starts decreasing as well, of about 0.1 bar on an average every 10° C. of reduction with respect to the reference temperature TR. However, the elastic constant K of spring 12 advantageously depends on the temperature in the terms previously illustrated (in the example shown in FIG. 8 relating to a Ni/TI steel, K decreases of about 5.24% every −10° C.), so that with a temperature reduction the constant too decreases, causing a reduction in the calibration preload as well. In this way the pressure reduction that is transferred to bag 21 from the inside of tyre 3 does not activate spring 12 because the spring preload is substantially decreased to such a value that it keeps balanced in spite of the reduced tyre pressure.

In this manner wheel 1 is not submitted to useless loading cycles due to possible high thermal ranges of the room temperature that would bring to a quick consumption of the fluid stored inside tank 4, which fluid would then be discharged when the tyre temperature approaches the reference temperature TR again, by means of valve 20, for example. Said valve 20 in a preferred embodiment is designed to avoid sudden overpressures, in case of failure of valve 5 for example, and when it is necessary to control pressure within the inner volume 3' of the tyre, also allowing the tyre inflation.

It is to be noted that the provided range in accordance with the invention within which said elastic constant varies substantially comprises the room temperature of normal operation of the tyre. This means that the concerned wheel 1 when it has to operate to such temperatures has a temperature-compensated pressure control because valve 5 does not start operation if the pressure reduction is only due to variations in the room temperature.

Also to higher temperatures with respect to the upper limit of said range an important variation in said elastic constant K does not occur but this fact is irrelevant as regards the correct operation of wheel 1. In fact, when it is hot (at temperatures higher than TR) the tyre is self-balancing, i.e. the higher pressure due to the high temperatures is used to support it under those operating conditions.

It is further to be noticed that still when it is hot, the higher pressure existing within tyre 3, being transferred into bag 21, further compresses spring 12, which spring avoids every reloading by increasingly moving away from cap 14.

Finally it will be recognised that the inner arrangement of the elements of valve 5 can be easily modified so as to have a closure member that is opened by effect of a pulling action of spring 12 and not a thrusting action as previously illustrated. In this case the elastic constant K of the elastic element must increase on decreasing of the temperature in the previously mentioned temperature ranges, in order to obtain the same operation of said valve 5.

The invention claimed is:

1. A method of controlling an inner pressure of a tyre mounted on a rim, said method comprising the steps of:
    inflating an inner volume of the tyre to an operating pressure at a reference temperature;
    admitting a fluid compressed to a first pressure higher than the operating pressure of the tyre at the reference temperature into a tank associated with the rim;
    bringing the inner volume of said tyre into communication with said tank when the pressure of the inner volume of said tyre is lower than said operating pressure, by means of at least one mechanical valve opening which is controlled by an elastic element having an elastic constant, the elastic element being operatively associated with at least one moveable non-deformable closure member designed to open and close at least one port in said valve, and the elastic constant varying within a temperature range of −50° C. to +50° C. in such manner that said valve is maintained in a closed position following a reduction in the inner tyre pressure due to a temperature reduction within said range; and
    stopping the communication between said inner volume and the tank when said tyre pressure is substantially equal to said operating pressure,
    wherein said step of bringing the inner volume of said tyre into communication with said tank takes place when the pressure of the inner volume of said tyre is lower than said operating pressure by at least 5%.

2. The method as claimed in claim 1, wherein said temperature range is about −30° C. to about +50° C.

3. The method as claimed in claim 1, wherein said temperature range is about −30° C. to about +20° C.

4. The method as claimed in claim 1, wherein said elastic element controlling opening of said valve has a value of elastic constant measured at −50° C. differing from the value of elastic constant measured at +50° C. by at least 10%.

5. The method as claimed in claim 1, wherein said elastic element controlling opening of said valve has a value of elastic constant measured at −50° C. differing from the value of elastic constant measured at +50° C. by no more than 40%.

6. The method as claimed in claim 2, wherein said elastic element controlling opening of said valve has a value of elastic constant measured at −30° C. differing from the value of elastic constant measured at +50° C. by at least 10%.

7. The method as claimed in claim 2, wherein said elastic element controlling opening of said valve has a value of elastic constant measured at −30° C. differing from the value of elastic constant measured at +50° C. by no more than 40%.

8. The method as claimed in claim 3, wherein said elastic element controlling opening of said valve has a value of elastic constant measured at −30° C. differing from the value of elastic constant measured at +20° C. by at least 10%.

9. The method as claimed in claim 3, wherein said elastic element controlling opening of said valve has a value of elastic constant measured at −30° C. differing from the value of elastic constant measured at +20° C. by no more than 40%.

10. The method as claimed in claim 4, wherein said elastic element controlling opening of said valve has a value of elastic constant measured at −50° C. differing from the value of elastic constant measured at +50° C. by at least 20%.

11. The method as claimed in claim 5, wherein said elastic element controlling opening of said valve has a value of elastic constant measured at −50° C. differing from the value of elastic constant measured at +50° C. by no more than 30%.

12. The method as claimed in claim 6, wherein said elastic element controlling opening of said valve has a value of elastic constant measured at −30° C. differing from the value of elastic constant measured at +50° C. by at least 20%.

13. The method as claimed in claim 7, wherein said elastic element controlling opening of said valve has a value of elastic constant measured at −30° C. differing from the value of elastic constant measured at +50° C. by no more than 30%.

14. The method as claimed in claim 8, wherein said elastic element controlling opening of said valve has a value of elastic constant measured at −30° C. differing from the value of elastic constant measured at +20° C. by at least 20%.

15. The method as claimed in claim 9, wherein said plastic element controlling opening of said valve has a value of elastic constant measured at −30° C. differing from the value of elastic constant measured at +20° C. by no more than 30%.

16. The method as claimed in claim 1, wherein the ratio between said operating pressure of the tyre and said first pressure in said tank is about 0.1 to about 0.6.

17. The method as claimed in claim 16, wherein the ratio between said operating pressure of the tyre and said first pressure in said tank is about 0.2 to about 0.4.

18. The method as claimed in claim 1, wherein said first pressure in said tank is about 8 to about 12 bars.

19. The method as claimed in claim 18, wherein said first pressure in said tank is about 8.5 to about 10 bars.

20. The method as claimed in claim 1, wherein said step of bringing the inner volume of said tyre into communication with said tank takes place when the pressure of the inner volume of said tyre is lower than said operating pressure by at least 5%.

21. The method as claimed in claim 1, wherein said elastic constant decreases on decreasing of the temperature in said temperature range.

22. The method as claimed in claim 1, wherein said elastic constant increases on decreasing of the temperature in said temperature range.

23. A wheel having a controlled and compensated pressure, comprising:
a rim associated with a tank adapted to be filled with a fluid to a first pressure;
a tyre mounted on said rim and having an inner volume inflated to an operating pressure, said operating pressure being lower than said first pressure; and
at least one valve adapted to regulate communication between said tank and the inner volume of said tyre, said valve comprising:
a diaphragm,
a cap,
a needle, and
at least one elastic element operatively associated with at least one moveable non-deformable closure member designed to open and close at least one port in said valve to bring said tank into communication with said tyre when pressure in said tyre is lower than said operating pressure, said elastic element having an elastic constant varying within a temperature range from −50° C. to +50° C. in such a manner that the valve is maintained in a closed position following a reduction in the inner tyre pressure due to a temperature reduction within said range,
wherein the elastic element exerts a pressure on the diaphragm which brings the cap to act against the needle, thereby causing the at least one non–deformable closure member to open the at least one port.

24. The wheel as claimed in claim 23, wherein said temperature range is about −30° C. to about +50° C.

25. The wheel as claimed in claim 23, wherein said temperature range is about −30° C. to about +20° C.

26. The wheel as claimed in claim 23, wherein said elastic element controlling opening of said port has a value of elastic constant measured at −50° C. differing from the value of elastic constant measured at +50° C. by at least 10%.

27. The wheel as claimed in claim 23, wherein said elastic element controlling opening of said port has a value of elastic constant measured at −50° C. differing from the value of elastic constant measured at +50° C. by no more than 40%.

28. The wheel as claimed in claim 24, wherein said elastic element controlling opening of said port has a value of elastic constant measured at −30° C. differing from the value of elastic constant measured at +50° C. by at least 10%.

29. The wheel as claimed in claim 24, wherein said elastic element controlling opening of said port has a value of elastic constant measured at −30° C. differing from the value of elastic constant measured at +50° C. by no more than 40%.

30. A wheel as claimed in claim 25, wherein said elastic element controlling opening of said port has a value of elastic constant measured at −30° C. differing from the value of elastic constant measured at +20° C. by at least 10%.

31. The wheel as claimed in claim 25, wherein said elastic element controlling opening of said port has a value of elastic constant measured at −30° C. differing from the value of elastic constant measured at +20° C. no more than 40%.

32. The wheel as claimed in claim 26, wherein said elastic element controlling opening of said port has a value of elastic constant measured at −50° C. differing from the value of elastic constant measured at +50° C. by at least 20%.

33. The wheel as claimed in claim 27, wherein said elastic element controlling opening of said port has a value of elastic constant measured at −50° C. differing from the value of elastic constant measured at +50° C. by no more than 30%.

34. The wheel as claimed in claim 28, wherein said elastic element controlling opening of said port has a value of elastic constant measured at −30° C. differing from the value of elastic constant measured at +50° C. by at least 20%.

35. The wheel as claimed in claim 29, wherein said elastic element controlling opening of said port has a value of elastic constant measured at −30° C. differing from the value of elastic constant measured at +50° C. by no more than 30%.

36. The wheel as claimed in claim 30, wherein said elastic element controlling opening of said port has a value of elastic constant measured at −30° C. differing from the value of elastic constant measured at +20° C. by at least 20%.

37. The wheel as claimed in claim 31, wherein said elastic element controlling opening of said port has a value of elastic constant measured at −30° C. differing from the value of elastic constant measured at +20° C. by no more than 30%.

38. The wheel as claimed in claim 23, wherein said tank is integrated into said rim.

39. The wheel as claimed in claim 23, wherein said tank involves a volume such that the ratio between said volume of said tank and said inner volume of the tyre is about 0.1 to about 0.4.

40. The wheel as claimed in claim 39, wherein said ratio is about 0.12 to about 0.25.

41. The wheel as claimed in claim 23, wherein said elastic element is a spring.

42. The wheel as claimed in claim 23, wherein said elastic constant decreases on decreasing of the temperature in said temperature range.

43. The wheel as claimed in claim 23, wherein said elastic constant increases on decreasing of the temperature in said temperature range.

44. The wheel as claimed in claim 23, wherein said valve brings said tyre into communication with said tank when pressure in said tyre is lower by at least 5% than said operating pressure.

45. The wheel as claimed in claim 23, wherein said wheel comprises an inflation valve operatively associated with said tank.

46. The wheel as claimed in claim 23, wherein said wheel comprises a control and restoration valve associated with said tyre.

47. The wheel as claimed in claim 41, wherein said elastic element comprises a second spring operatively associated with said spring.

48. The wheel as claimed in claim 47, wherein said second spring has an elastic constant substantially constant within a temperature range of −50° C. to +50° C.

49. The wheel as claimed in claim 48, wherein said second spring supports a greater portion of the load than said elastic element.

50. The wheel as claimed in claim 49, wherein the load supported by the second spring is about 60% to about 95% of the load supported by said elastic element.

51. The wheel as claimed in claim 49, wherein the load supported by the second spring is about 70% to about 80% of the load supported by said elastic element.

52. The wheel as claimed in claim 47, wherein the second spring is concentrically coupled to said spring.

53. The wheel as claimed in claim 52, wherein the second spring is external with respect to said spring.

54. A valve suitable for a wheel having a controlled and compensated pressure, said valve being adapted to regulate communication between a tank and an inner volume of a tyre provided in said wheel, said valve comprising:
   a diaphragm;
   a cap;
   a needle; and
   at least one elastic element operatively associated with at least one moveable non-deformable closure member designed to open and close at least one port in said valve to bring said tank into communication with said tyre when pressure in said tyre is lower than an operating pressure, said elastic element having an elastic constant varying within a temperature range from −50° C. to +50° C. in such a manner that the valve is maintained in a closed position following a reduction in the inner tyre pressure due to a temperature reduction within said range,
   wherein the elastic element exerts a pressure on the diaphragm which brings the cap to act against the needle, thereby causing the at least one non-deformable closure member to open the at least one port.

55. The valve as claimed in claim 54, wherein said temperature range is about −30° C. to about +50° C.

56. The valve as claimed in claim 54, wherein said temperature range is about −30° C. to about +20° C.

57. The valve as claimed in claim 54, wherein said elastic element controlling opening of said port has a value of elastic constant measured at −50° C. differing from the value of elastic constant measured at +50° C. by at least 10%.

58. The valve as claimed in claim 54, wherein said elastic element controlling opening of said port has a value of elastic constant measured at −50° C. differing from the value of elastic constant measured at +50° C. by no more than 40%.

59. The valve as claimed in claim 55, wherein said elastic element controlling opening of said port has a value of elastic constant measured at −30° C. differing from the value of elastic constant measured at +50° C. by at least 10%.

60. The valve as claimed in claim 55, wherein said elastic element controlling opening of said port has a value of elastic constant measured at −30° C. differing from the value of elastic constant measured at +50° C. by no more than 40%.

61. The valve as claimed in claim 56, wherein said elastic element controlling opening of said port has a value of elastic constant measured at −30° C. differing from the value of elastic constant measured at +20° C. by at least 10%.

62. The valve as claimed in claim 56, wherein said elastic element controlling opening of said port has a value of elastic constant measured at −30° C. differing from the value of elastic constant measured at +20° C. by no more than 40%.

63. The valve as claimed in claim 57, wherein said elastic element controlling opening of said port has a value of elastic constant measured at −50° C. differing from the value of elastic constant measured at +50° C. by at least 20%.

64. The valve as claimed in claim 58, wherein said elastic element controlling opening of said port has a value of elastic constant measured at −50° C. differing from the value of elastic constant measured at +50° C. by no more than 30%.

65. The valve as claimed in claim 59, wherein said elastic element controlling opening of said port has a value of elastic constant measured at −30° C. differing from the value of elastic constant measured at +50° C. by at least 20%.

66. The valve as claimed in claim 60, wherein said elastic element controlling opening of said port has a value of elastic constant measured at −30° C. differing from the value of elastic constant measured at +50° C. by no more than 30%.

67. The valve as claimed in claim 61, wherein said elastic element controlling opening of said port has a value of elastic constant measured at −30° C. differing from the value of elastic constant measured at +20° C. by at least 20%.

68. The valve as claimed in claim 62, wherein said elastic element controlling opening of said port has a value of elastic constant measured at −30° C. differing from the value of elastic constant measured at +20° C. by no more than 30%.

69. The valve as claimed in claim 54, wherein said elastic element is a spring.

70. The valve as claimed in claim 54, wherein said elastic constant decreases on decreasing of the temperature in said temperature range.

71. The valve as claimed in claim 54, wherein said elastic constant increases on decreasing of the temperature in said temperature range.

72. The valve as claimed in claim 54, wherein said valve brings said tyre into communication with said tank when pressure in said tyre is lower by at least 5% than said operating pressure.

73. The valve as claimed in claim 69, wherein said elastic element comprises a second spring operatively associated with said spring.

74. The valve as claimed in claim 73, wherein said second spring has an elastic constant substantially constant within a temperature range from −50° C. to +50° C.

75. The valve as claimed in claim 74, wherein said second spring supports a greater portion of the load than said elastic element.

76. The valve as claimed in claim 75, wherein the load supported by the second spring is about 60% to about 95% of the load, supported by said elastic element.

77. The valve as claimed in claim 75, wherein the load supported by the second spring is about 70% to about 80% of the load supported by said elastic element.

78. The valve as claimed in claim 73, wherein the second spring is concentrically coupled to said spring.

79. The valve as claimed in claim 78, wherein the second spring is external with respect to said spring.

80. A wheel having a controlled and compensated pressure, comprising:
   a rim associated with a tank adapted to be filled with a fluid to a first pressure;
   a tyre mounted on said rim and having an inner volume inflated to an operating pressure, said operating pressure being lower than said first pressure; and
   at least one valve adapted to regulate communication between said tank and the inner volume of said tyre,
   said valve comprising at least one elastic element operatively associated with at least one movable non-deformable closure member designed to open and close at least one port in said valve to bring said tank into communication with said tyre when pressure in said tyre is lower than said operating pressure, said elastic element having an elastic constant varying within a temperature range from −50° C. to +50° C. in such a manner that the valve is maintained in a closed position following a reduction in the inner tyre pressure due to a temperature reduction within said range,
   wherein the elastic element is a spring,
   wherein the elastic element comprises a second spring operatively associated with the spring, and
   wherein a load supported by the second spring is about 60% to about 95% of a load supported by the elastic element.

* * * * *